United States Patent [19]
Arnone et al.

[11] Patent Number: 5,400,674
[45] Date of Patent: Mar. 28, 1995

[54] PRECISION COMPONENT POSITIONER

[75] Inventors: David F. Arnone, Palo Alto; Francis S. Luecke, San Jose, both of Calif.

[73] Assignee: New Focus, Inc., Sunnyvale, Calif.

[21] Appl. No.: 186,743

[22] Filed: Jan. 25, 1994

Related U.S. Application Data

[62] Division of Ser. No. 880,438, May 8, 1992, Pat. No. 5,282,393.

[51] Int. Cl.[6] .................... G05G 11/00; F16H 25/20
[52] U.S. Cl. .................. 74/490.13; 74/89.15;
269/60; 269/71; 269/73; 359/393
[58] Field of Search ........ 74/89.15, 424.8 R, 479 MF;
269/60, 71, 73; 359/393

[56] References Cited

U.S. PATENT DOCUMENTS

| Re. 30,406 | 9/1980 | Johanson | 361/296 |
|---|---|---|---|
| 2,345,312 | 3/1944 | Sorensen | 33/174 |
| 3,165,141 | 1/1965 | Tishken | 153/32 |
| 3,402,613 | 9/1968 | Neusel et al. | 74/89.15 |
| 3,525,140 | 8/1970 | Cachon et al. | 359/393 |
| 3,527,110 | 9/1970 | Rogers | 74/89.15 |
| 3,628,386 | 12/1971 | Blum | 74/89.15 X |
| 4,417,843 | 11/1983 | Bonga | 414/676 |
| 5,077,622 | 12/1991 | Lynch et al. | 359/813 |
| 5,109,724 | 5/1992 | Delarue et al. | 74/479 |
| 5,140,470 | 8/1992 | Luecke | 359/818 |

FOREIGN PATENT DOCUMENTS 2131908 6/1984 United Kingdom .

OTHER PUBLICATIONS

IBM Tech. Discl. Bulletin, vol. 28, No. 12, May 1986, 2 pages.
Kittel, (1989) "Precision Mechanics" Class Notes, p. 23.
Oriel Lit.-2 pgs, Model 19601, Long Beach, Calif.
Newport Lit.-12 pgs, Model 561, Fountain Valley, Calif.
Melles Griot Lit.-1 pg, Model 07HF001, Irvine, Calif.
Ealing Lit.-1 pg., Model 35-7426, Holliston, Mass.

*Primary Examiner*—Allan D. Herrmann
*Attorney, Agent, or Firm*—Townsend and Townsend Khourie and Crew

[57] ABSTRACT

A precision component mounting and positioning apparatus comprises a frame member and a stage member suspended in the frame member. The frame member is adapted to be mounted on a support surface, and the stage member is adapted to receive a precision component, typically a precision optical component such as an optical fiber or waveguide. The stage member can be positionally adjusted relative to the frame member in five degrees of freedom. Three axially oriented actuators are grounded in the frame member to provide for selectively rotating the stage member about two orthogonally disposed transverse axes relative to the frame member as well as for axially translating the stage member relative to the frame member. A pair of orthogonally opposed transverse actuators are grounded in the frame member and oriented to provide for transverse translation of the stage member relative to the frame member.

3 Claims, 5 Drawing Sheets

PRECISION COMPONENT POSITIONER

This is a Division of application Ser. No. 07/123,456, filed May 8, 1992, now U.S. Pat. No. 5,282,393.

BACKGROUND OF THE INVENTION

1. Field of the Invention

The present invention relates generally to apparatus for adjustably mounting and positioning precision components, elements and devices. More particularly, the present invention relates to apparatus for positioning optical elements, such as optical fibers and waveguides, where the position of the optical element can be precisely adjusted relative to three linear axes and two rotational axes.

The use of adjustable mounting apparatus for supporting optical components, such as optical fibers, mirrors, beam splitters, lenses, gratings, and the like, is known. For example, it is frequently necessary to position a first optical element, such as an optical fiber or waveguide, relative to a second optical element, such as another optical fiber or waveguide, a microscope objective lens, or the like. Frequently, the relative positioning of such optical components must be very precise, with accuracies on the order of wavelength dimensions sometimes being necessary. In the future, it is expected that allowable tolerances will be even smaller.

In order to provide for multiple positional adjustments, many previous component mounting devices have placed a series of independently positional stages or platforms on a single base. Each stage or platform is then adjustable in a single dimension relative to the underlying stage or base, thus permitting adjustment in as many dimensions as desired. While generally workable, such devices are mechanically complex and cumbersome. Moreover, each linkage between a stage and an underlying stage or base introduces six potential degrees of error in positioning. Thus, as the stages are built up one over another, the sources of error are compounded. For example, a component comprised of four stages mounted over a base will have twenty-four degrees of freedom, thus greatly reducing the overall stability of the platform. The model 19601 optical fiber positioner available from Oriel, Long Beach, Calif. is exemplary of such systems having multiple independently positionable stage elements built in series over a common base.

Another problem in the construction of precision component mounting devices arises from cross-coupling between position adjustment mechanisms. Cross-coupling refers to the disturbance of one positional parameter (in one degree freedom) arising from the change in another positional parameter (in another degree freedom). For example, changing position along one linear axis may cause an optical element to change its rotational orientation or to change its position along another linear axis. Often such cross-coupling effects are very small, but they can be significant in high precision systems.

For these reasons, it would be desirable to provide component mounting devices having improved stability, reduced cross-coupling between individual positioning mechanisms, and reduced complexity. In particular, it would be desirable to provide a mounting apparatus for optical fibers and waveguides, where the tip of the fiber or waveguide may be positioned at a desired location, with the location then being adjustable in multiple degrees of freedom with very high precision and repeatability. The mounting device should further provide for both coarse and fine position adjustment in at least some of the degrees of freedom, and should preferably provide for simplified use and implementation. In particular, it would be desirable to provide an optical fiber mounting device which comprises a single frame member and single stage member, where the frame member may be mounted on a surface and the stage member is positioned by a plurality of independent actuators which are grounded through the frame member.

2. Description of the Background Art

A six-axis precision positioning system having six independent linear actuators (with ball or sphere ends) is described in IBM Technical Disclosure Bulletin, Vol. 28, No. 12, May 1986. U.S. Pat. No. 5,077,622, describes a device for positioning an optical fiber or other optical element relative to an incident beam using positionable lenses. Mechanical clutches for precision linear positioning are described in U.S. Pat. No. Re. 30,406. A lever arm drive for a tangent screw mechanism is described in Kittel, Precision Mechanics-Class Notes (1989 Copyright) at page 23. Oriel, Long Beach, Calif., sells devices for mounting optical fibers relative to other optical elements, such as microscope objective lenses. The devices provide three degrees of translational positioning and two degrees of rotational positioning with coarse/fine adjustment in the nominal vertical and horizontal directions. Model 19601 available from Oriel is exemplary of the coupling devices described above. Other optical fiber mounting devices are commercially available from various suppliers such as Newport, Fountain Valley, Calif. (Model 561); Melles Griot, Irvine, Calif. (Model 07HF001); and Ealing, Holliston, Mass. (Model 35-7426).

Copending application Ser. No. 07/638,886, commonly assigned with the present application, describes an optical mounting apparatus having a stage plate mounted on a backing plate with three axial actuators capable of providing axial translation and rotation about two transverse axes. Copending application Ser. No. 07/785,773, commonly assigned with the present application, describes a support platform which is positionable in four degrees of freedom through a single base.

SUMMARY OF THE INVENTION

A precision component mounting device comprises a frame member and a stage member suspended on the frame member. The frame member is detachably mountable on a surface, such as a laboratory bench or work table, and the stage member includes a mounting means for securing a precision component, usually an optical element such as an optical fiber or waveguide. The mounting device will usually also include means for holding a second precision component, usually another optical fiber, waveguide, lens, or the like, which is to be held in a precise spatial relationship with the first component. The present invention provides a unique system for positioning the stage member relative to the frame member, thus allowing the user to precisely position the first and second precision components relative to each other.

In a first aspect of the present invention, the component mounting and positioning device comprises the frame member, the stage member, three axial actuators grounded through the frame member and engaging a transverse surface on the stage member, and two transverse actuators grounded through the frame member and engaging first and second orthogonally disposed edge surfaces on the stage member. The three axial actuators are spaced-apart from each other and from the location where the precision element or component is held, typically in a rectangular or square pattern, thus permitting the selective rotation of the element about a transverse axis (by selectively axially translating individual actuators or pairs of actuators relative to the frame member) or axial translation of the stage member (by axially translating all three of the actuators simultaneously). The two transverse actuators may be translated in a transverse direction relative to the frame member to provide for transverse positioning of the stage member and thus the element. The axial actuators will usually be threaded shafts, but might also be other mechanical and electromechanical mechanisms, such as piezo stacks (i.e., stacks of piezo electric elements) connected in parallel to a suitable electrical source. In this way, the precision element may be positionally adjusted in five degrees of freedom, with the five actuators responsible for such positional adjustment all being grounded through the single frame member. Such a structure is highly stable and provides for precise and repeatable positioning of the precision element with minimum introduction of mechanical inaccuracies.

In a second aspect, the device for mounting and positioning a precision component or element comprises the frame member and stage member in combination with at least one positionable actuator. The positionable actuator comprises a first externally threaded shaft threadably received in the frame member and disposed to engage a surface on the stage member. The first shaft includes a driver connection (such as a hex connector or screw driver slot) and threadably receives a lever over its exterior surface, where either the driver connection or the lever can be used for rotating the shaft to cause linear translation relative to the frame. A second externally threaded shaft is also received in the frame member and is disposed to laterally engage the lever. The second shaft also includes a driver connection, and rotation of the second shaft (through the driver connection) causes a rotation of the lever, thus rotating the first shaft (optional through a mechanical slip clutch as described below). In this way, coarse positioning of the stage member can be achieved by directly turning the first shaft through its driver connection, and fine positioning of the stage member can be achieved by rotating the second shaft through its driver connection. It will be appreciated that positioning through the second shaft is much more precise since it will take a number of complete rotations of the second shaft to cause only a partial rotation of the first shaft.

In a third aspect of the present invention, the component mounting device includes the frame member and stage member, as previously described, in combination with three axially oriented externally threaded shafts. The three shafts are threadably received in the frame member and engage a transverse surface of the stage member. Each shaft carries a drive gear frictionally mounted thereon, and the three drive gears are coupled together by a central pinion gear. The frictional force between each drive gear and its respective threaded shaft is such that rotation of any drive gear causes rotation of all three drive gears, which in turn rotate the threaded shafts, in unison. In this way, axial translation of the stage member relative to the frame member can be achieved. In contrast, the frictional force between each threaded shaft and respective drive gear is insufficient to transmit rotational motion from the shaft back through the drive gears and central pinion gear. Each shaft can thus be independently rotated in order to rotationally position the stage member about a transverse axis without affecting the positions of the other threaded shafts.

In a fourth aspect of the present invention, a mechanical slip clutch comprises an externally threaded shaft and an associated drive member, which is typically either the drive gear or the lever described above. The drive member is mounted on the threaded shaft with a first frictional torque, and a cap member is threadably received on the shaft in tandem with the drive member. By placing a compression spring member between the drive member and the cap member, an axial spring force is applied against both the drive member and the cap member. Such axial spring force in turn causes an increase in the frictional coupling between the drive member and the threaded shaft, thus increasing the frictional torque between the drive member and the shaft. The mechanical slip clutch mechanism is advantageously employed with both the axial actuators and transverse actuators described above in connection with the other aspects of the present invention.

BRIEF DESCRIPTION OF THE DRAWINGS

FIG. 8 is an isolated view of the axial actuator system of the device of FIG. 1a.

DESCRIPTION OF THE SPECIFIC EMBODIMENTS

Figure 2:
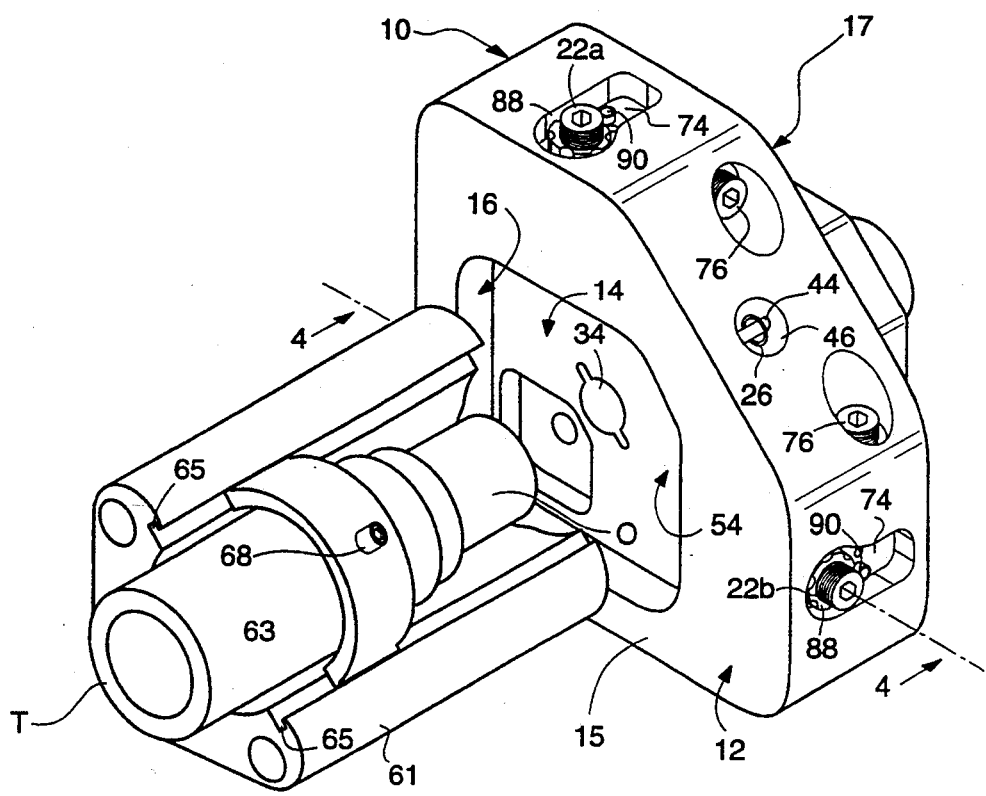
FIG. 2 is a first perspective view of the fully assembled device of FIGS. 1a and 1b.
Figure 3:
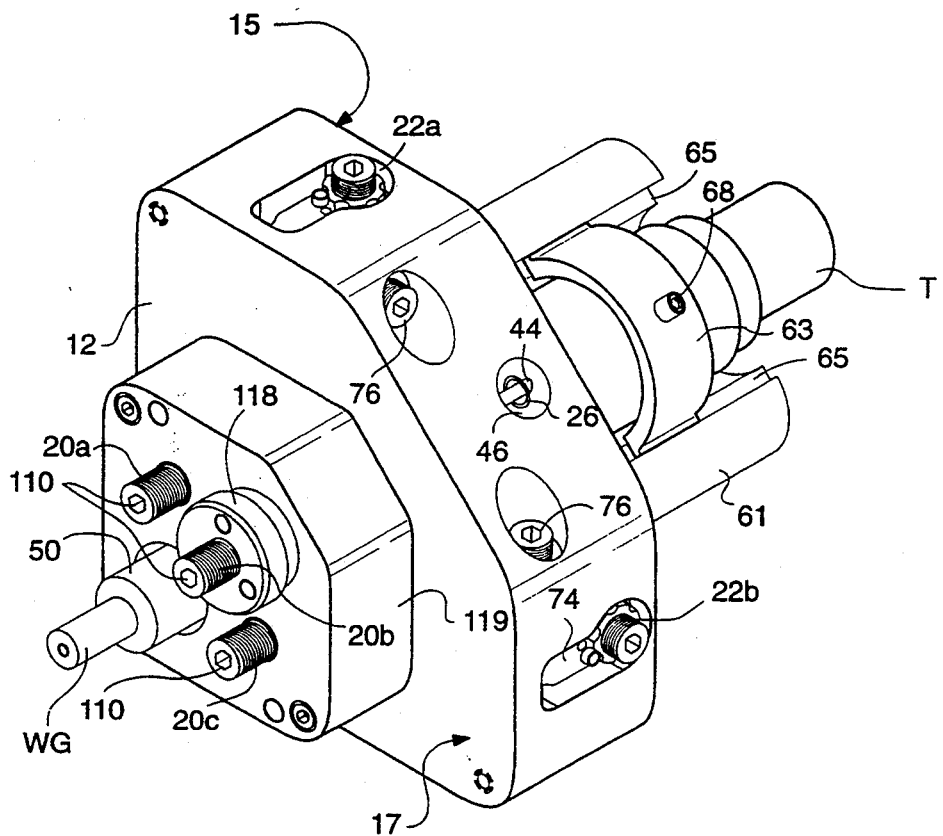
FIG. 3 is a second perspective view of the device of FIGS. 1a and 1b shown from the opposite side as FIG. 2.
Figure 4:
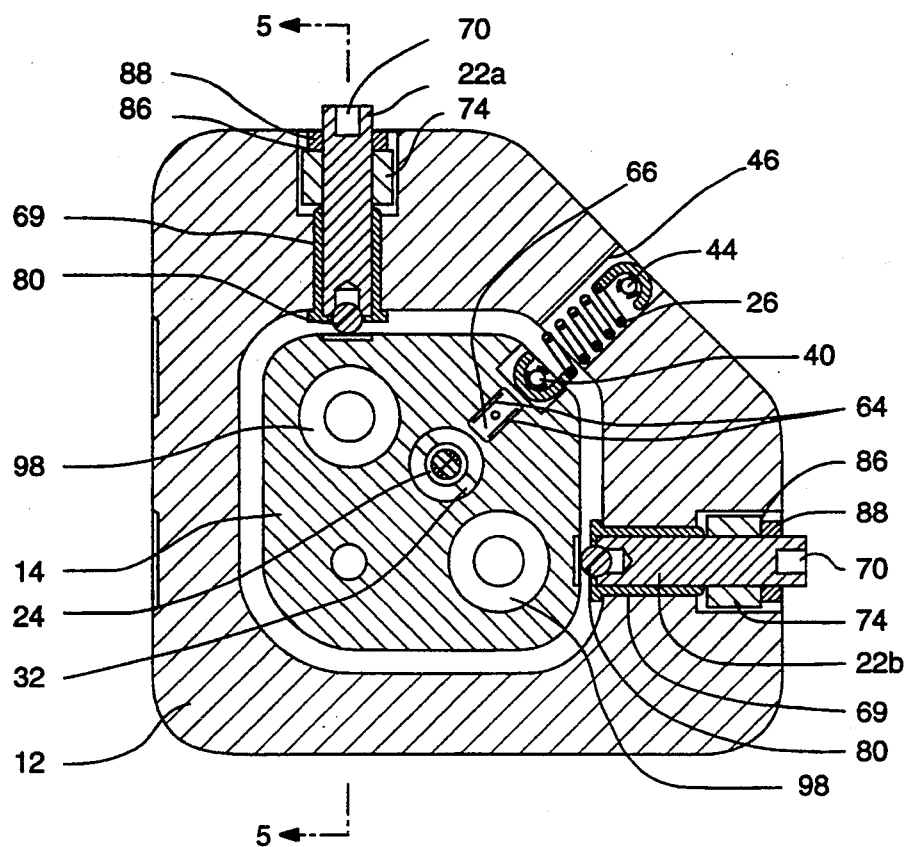
FIG. 4 is a cross-sectional view taken along line 4—4 of FIG. 2.
Figure 5:
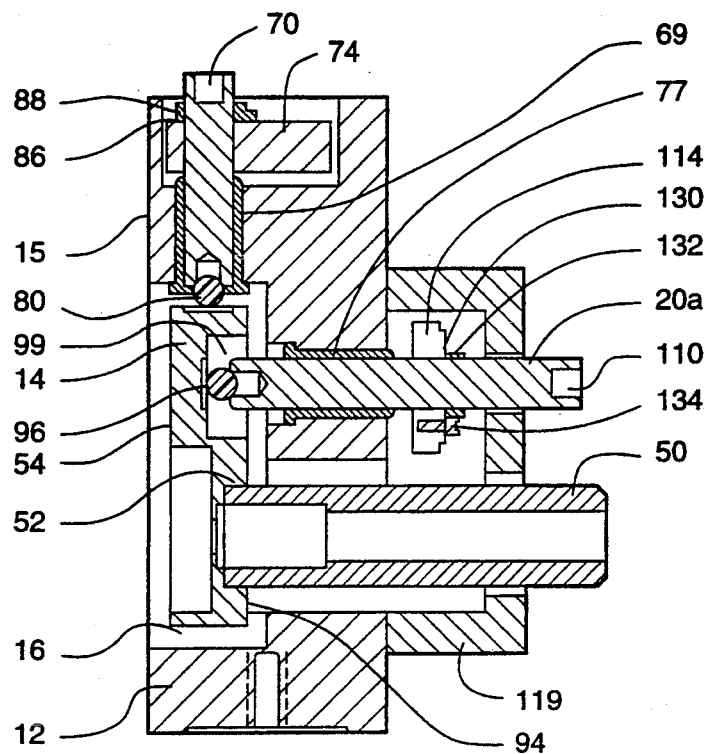
FIG. 5 is a cross-sectional view taken along line 5—5 of FIG. 4.
Figure 6:
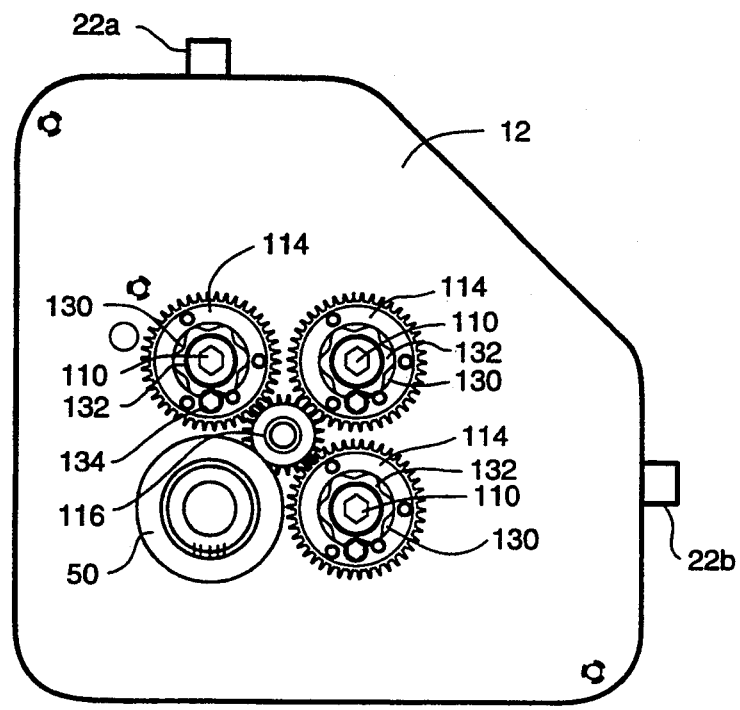
FIG. 6 is an elevational view of the device of FIG. 1a shown with the gear cover removed.
Figure 7:
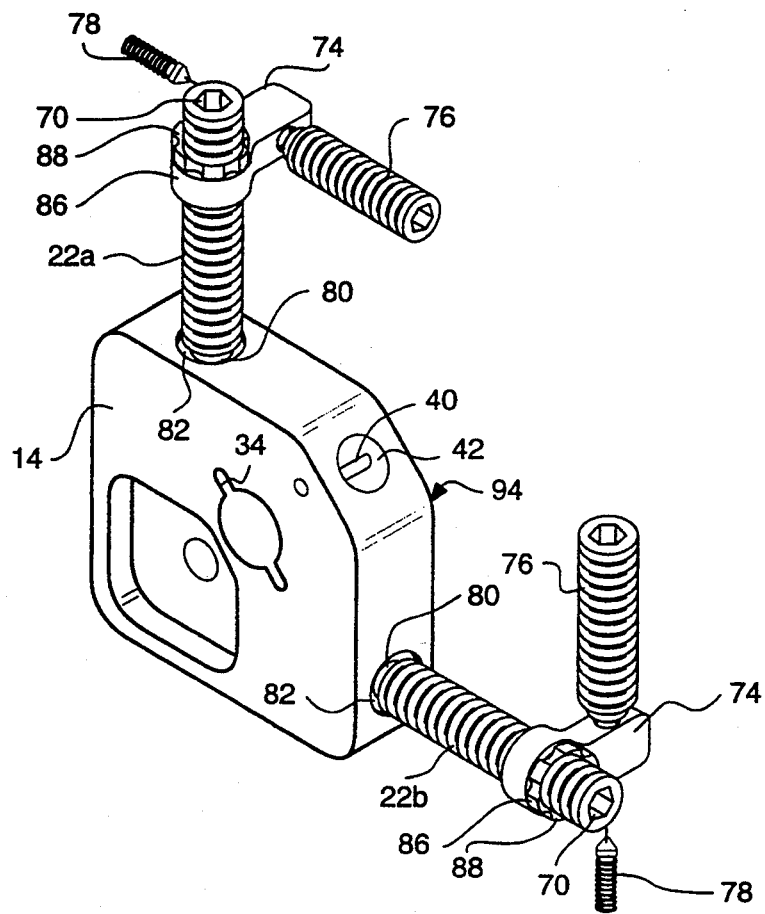
FIG. 7 is an isolated view of the transverse actuator system of the device of FIG. 1.

Referring to FIGS. 1a, 1b and 2-6, a component mounting and positioning device 10 comprises a frame member 12 and a stage member 14. The stage member 14 is suspended in a cavity 16 (best illustrated in FIGS. 1b and 5) formed in face 15 of the frame member 12. Stage member 14 will be suspended by a combination of three axial actuators 20, two transverse actuators 22, an axial spring 24, and a transverse spring 26. The axial spring 24 is secured at one end by a retaining rod 28 (FIG. 1a) which is received in slot 30 in face 17 of the frame member 12. The other end of the axial spring 24 held by a retaining pin 32 held in a retaining slot 34 formed in the stage member 14 (FIGS. 2, 4, and 7). In this way, the tensile force supplied by spring 24 holds the stage member 14 against the three axial actuators 20.

The transverse spring 26 is attached to retaining pin 40 held in aperture 42 formed at one corner of the stage member 14, as best seen in FIG. 4. The other end of transverse spring 26 is held on the retaining pin 44 held in an aperture 46 formed in the frame member 12. In this way, the force of spring 26 holds the stage member 14 against the two orthogonally disposed transverse actuator members 22.

The stage member 14 carries an optical fiber retaining tube 50 in a receptacle 52 formed in a transverse surface 94 thereof. The retaining tube 50 is adapted to receive an optical fiber, such as the optical waveguide WG (FIG. 3) which is usually held in a chuck. Waveguide WG is positioned so that the optical fiber is held with its distal tip surface disposed at the plane defined by the contact points of the three axial actuators 20 with the stage member 14. These contact points are defined by sapphire disks 60 received in receptacles 62 and by a pair of sapphire pads 64 received in a slot 66 in surface 94 of the stage member 14.

The three axial actuators 20 are grounded in the frame member 12 and generally act to both axially position the stage member 14 as well as to rotate the stage member about transverse axes defined by the lines between their contact points within the receptacles 62 and the slot 66. By "grounded," it is meant that the actuators will be positionable relative to the frame member so that they will act on the stage member 14 to move the stage member relative to the frame member. The manner by which the axial actuators 20 can be used to achieve both axial translation and rotation about transverse axis is described in copending application Ser. No. 07/638,886, the full disclosure which is incorporated herein by reference. The use of a slot for contacting the third axial actuator is necessary to limit rotational movement of the stage member 14 about a longitudinal axis when the stage member is being transversely moved by either of the transverse actuators 22a and 22b.

A second optical element, such as another optical fiber or waveguide, or a microscope objective lens, or the like, will be secured to the transverse face 15 of the frame member 12 in opposition to the stage member 14. In the illustrated embodiment, a microscope objective lens O held in an objective tube T is secured to the frame member 12 in an L-shaped clamp body 61 by a C-shaped clamp 63. The C-shaped clamp 63 is received in a pair of axial slots 65, and the entire assembly may be tightened using a set screw 68. It will be appreciated that the objective lens O can be linearly positioned within the L-shaped clamp body 61, as well as being rotationally positioned about its longitudinal axis, simply by loosening the set screw 68 and repositioning the objective tube T within the clamp body 61.

The stage member 14 is translated in orthogonally disposed transverse directions by the transverse actuators 22a and 22b, respectively. The transverse actuators 22a, 22b preferably comprise elongated externally threaded shafts which are received in threaded sleeves 69 (FIGS. 1b and 4) in the frame member 12. In this way, the actuators 22 can be translated relative to the frame member simply by turning the actuator, conveniently using a driver connection 70 (shown as a hex receptacle) located at the end of the actuator opposite to that which engages the stage member 14. The externally threaded shafts of the actuators 22 will typically have a relatively fine pitch, such as 80 pitch, to permit precise positioning of the stage member 14.

The use of even very fine pitch threaded actuator shafts, however, is not sufficient in itself to provide the high resolution necessary for positioning the stage member 14. As discussed above, it will frequently be necessary to provide very high resolutions, such as on the order of 0.1 $\mu$m or below. Few if any operators would have the manual dexterity to directly turn the threaded actuators 22a, 22b using a manual driver connected to the driver connector 70 to achieve such resolution. In order to provide an improved ability to position the actuators 22, the present invention utilizes a fine positioning lever 74 which is threadably received on each actuator 22, as best illustrated in FIGS. 4, 5, and 7. Since the lever 74 is threaded onto the actuator shaft 22a, 22b the actuator shaft continues to be rotatable relative to the lever. Thus, the operator will continue to be able to directly rotate each actuator 22a, 22b in order to provide for relatively coarse transverse positional adjustments. Sufficient friction will be provided between the lever 74 and actuator shaft 22a, 22b however, so that the turning of the lever will cause the shaft to turn and translate relative to the frame member 12.

In order to permit a very high degree of resolution through the lever 74, a second threaded shaft 76 is mounted in a sleeve 77 in the frame member 12 and disposed laterally against the respective lever arm. The second threaded shaft 76 will also have a very fine pitch thread, typically about 80 pitch, so that turning of the second shaft 76 will provide a very slow and highly controlled rotation of the lever 74.

Each lever 74 is held in place by a spring-loaded pin 78 which engages the lever on a side opposite to that engaged by the second shaft 76. The actuator shafts 22a 22b each carry an engagement ball 80 at their distal ends which are disposed against the stage member 14. In particular, the engagement balls 80 each contact a sapphire pad 82 which provides a very hard, flat surface to enhance precision. It will be appreciated that use of the engagement balls 80 permits a small degree of slippage between the actuator shafts 22a, 22b and the stage member 14 as the stage member is being manipulated in various degrees of freedom.

In a preferred embodiment, the fine positioning levers 74 are mechanically coupled to the actuator shafts 22 through a slip clutch mechanism comprising the lever itself, a compression spring element 86, and a cap member 88, as best illustrated in FIGS. 4, 5, and 7. The compression spring member 86 is disposed between the lever 74 and the cap member 88 and is under compression so that the threaded connection of the lever to the actuator shaft 22a, 22b is under longitudinal stress. That is, the internal threads on the lever 74 will be pushed longitudinally against the external threads on the actuator shaft 22 so that the rotational friction is increased. The degree that the rotational friction is increased depends on the amount that the spring member 86 has been compressed. Conveniently, cap member 88 will be a threaded nut so that compression on spring member 86 can be adjusted simply by turning the nut and translating the nut relative to the lever 74. Once a desired compression (and hence rotational friction) is achieved, a set pin 90 is put in place to fix the position of cap member 88 relative to the lever 74. In this way, the rotational friction between the lever 74 and the associated actuator shaft 22a, 22b can be fixed so that it is relatively easy to directly rotate the shaft through the driver connection 70 while assuring that there will be sufficient friction to permit positioning through the lever.

Axial and rotational positioning of the stage member 14 is achieved using the three axial positioning actuators 20. By axial positioning, it is meant that the frame member 14 is positioned in a direction normal to the plane of the frame member 12. By transverse positioning (as discussed above), it is meant that the stage member 14 is positioned along directions which lie in the plane of the frame member 12. By rotational positioning, it is meant that the stage member 14 is rotated about a transverse axis which lies within the plane of the frame member 12.

Figure 1A:
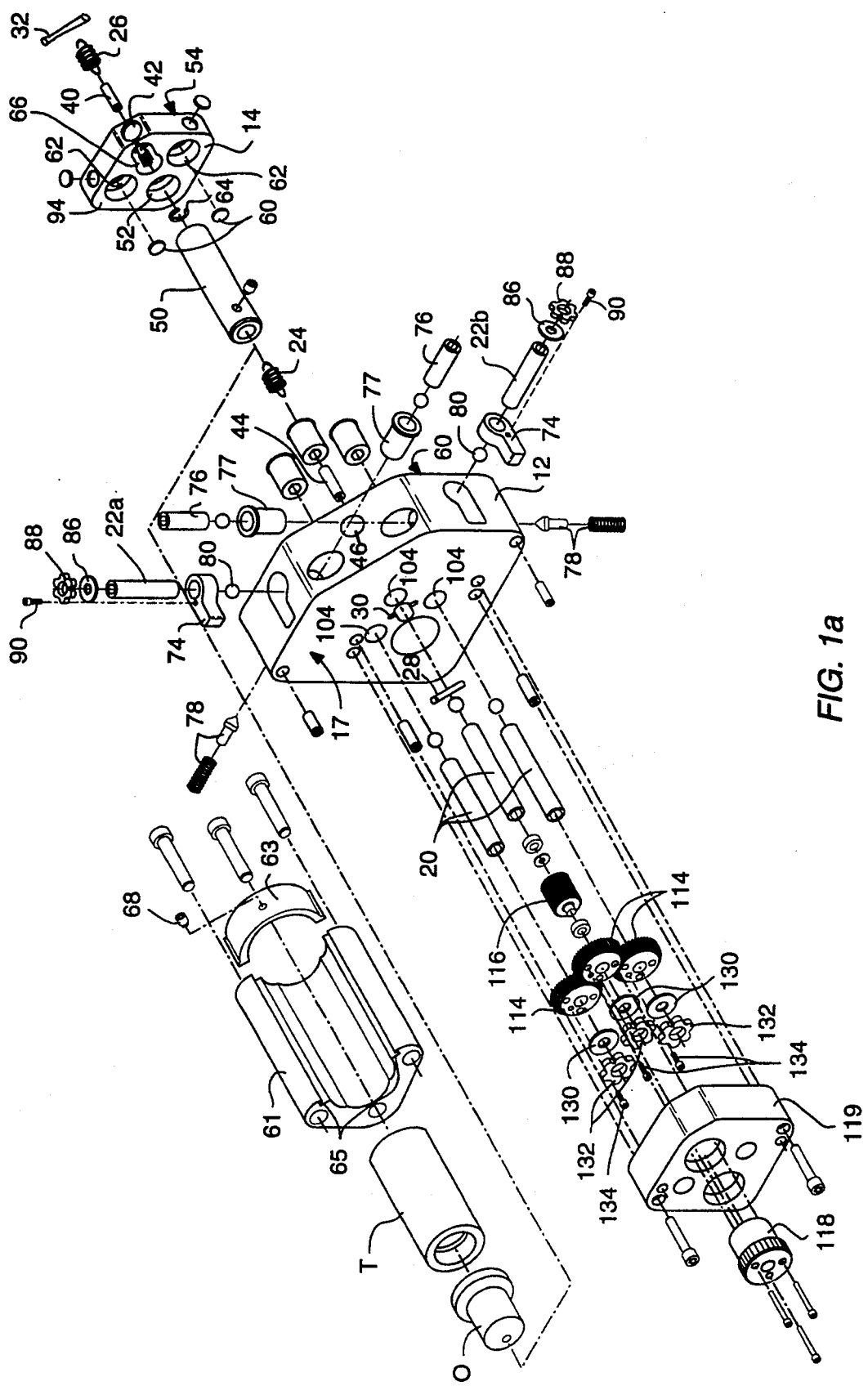
FIG. 1a is an exploded view of a component mounting and positioning device constructed in accordance with the principles of the present invention.
Figure 1B:
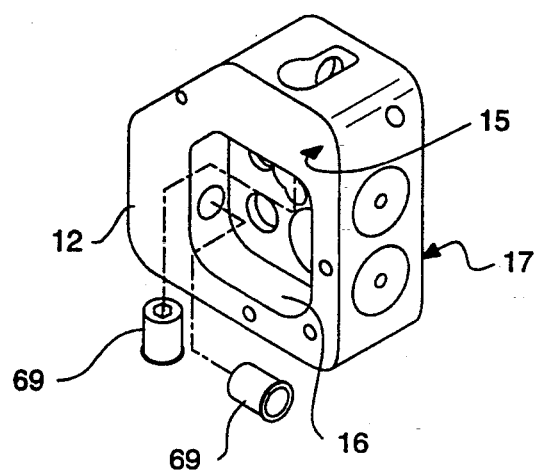
FIG. 1b is an exploded view of the frame member of the device of FIG. 1a, shown from an opposite perspective.
Figure 8:
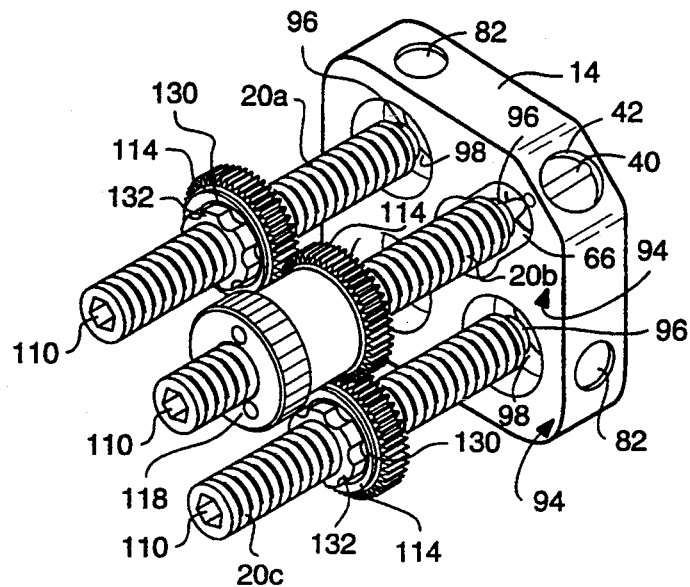
Figure 9:
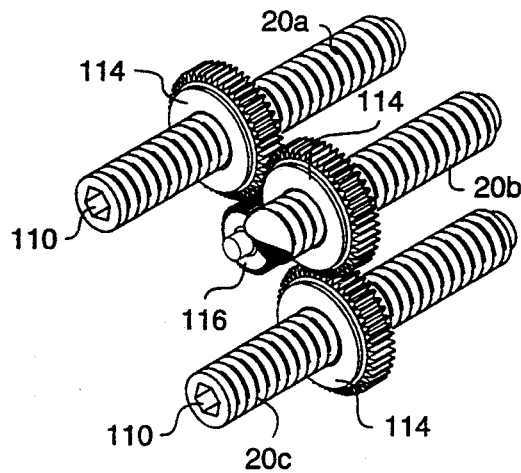
FIG. 9 is an isolated view of the axial actuator system of FIG. 8, illustrating the positioning of the central pinion gear.

As best illustrated in FIGS. 5, 8, and 9, the axial actuator shafts 20 are axially disposed against a transverse surface 94 of the stage member 14. In particular, axial actuators 20a and 20c have engagement balls 96 which are disposed against sapphire pads 98 received in circular cavities 99 formed in the transverse face 94. The actuator shaft 20b, however, engages a pair of sapphire pads 64 disposed in a slot 66, as best illustrated in FIG. 4. As discussed above, the sapphire pads 64 define a linear path for movement of the stage member 14 relative to the engagement ball 96 disposed at the engagement end of actuator shaft 20b. The linear path is necessary (in contrast to the flat sapphire pads 98 which permit two degrees of freedom, i.e. movement in the plane) in order to limit motion of the stage member 14 and to stabilize the stage member relative to the frame member 12. Without the limit on relative movement between the stage member 14 and the second actuator 20b, the system would have six degrees of freedom with only five contact or actuation points for determining its position. Thus, its position would be indeterminate.

The actuator shafts 20 are usually externally threaded shafts, similar to shafts 22 used for transverse positioning of the stage member 14. The axial actuator shafts 20 will typically have a fine pitch, with 80 pitch threads being satisfactory. The shafts 20 are threadably received in the frame member 12 through axial sleeves 77 so that rotation of each shaft individually will cause axial translation of that shaft relative to the frame member.

The distal ends of the actuators 20 which engage the stage member 14 define three points of the plane and thus determine the planar orientation of the stage member. By selectively axially translating the actuators 20, either individually, in pairs, or all three simultaneously, the desired rotation or axial translation of the stage member 14 can be achieved. Briefly, simultaneous and identical rotation of all three actuators 20 will result in axial translation of the stage member 14 without rotation about any transverse axis. In contrast, simultaneous rotation of actuators 20a and 20b (without rotation of actuator 20c) will result in rotation of the stage member 14 about a transverse axis which runs through the optical fiber receptacle 52 and the lower actuator contact point 62, i.e. a horizontal axis running through the optical fiber tip. Similarly, by rotating actuator shafts 20b and 20c simultaneously, the stage member 14 is rotated about a vertical axis running through the fiber tip receptacle 52 and the contact point of actuator 20a. A further description of such actuation systems is provided in copending application Ser. No. 07/638,886, the disclosure of which has previously been incorporated herein by reference.

In order to rotate the stage member 14 about either a horizontal or vertical axis, as described above, it will be necessary for the operator to individually actuate the actuators 20 through the driver connections 110 located at the proximal ends opposite from the engagement balls 96. The operator will turn each actuator shaft 20 separately and independently through the number of turns necessary to achieve the desired rotation.

In order to achieve axial translation of the stage member 14, in contrast, a coupling mechanism has been provided which permits simultaneous rotation of all three actuators 20. The coupling mechanism comprises a drive gear 114 threadably received on each of the axial actuator shafts 20, as best illustrated in FIGS. 6, 8, and 9. The drive gears 114 do not engage each other, but instead are coupled through a central pinion gear 116, as best illustrated in FIG. 9. Thus, turning any one of the drive gears 114 will cause a simultaneous and equal rotation of each of the drive gears. Conveniently, a knob 118 is attached to drive gear 114 which is mounted on threaded actuator shaft 20b. As described in more detail herein below, the knob 118 can be used to simultaneously rotate all three actuator shafts 20, while the actuator shafts 20a, 20b, and 20c can be rotated individually through the driver connection 110. The drive gears will usually be covered by a gear cover 119, best illustrated in FIGS. 1a, 3 and 5.

Mechanical slip clutch mechanisms are provided to permit the selective actuation of either the individual actuator shafts 20 or all three actuator shaft simultaneously. The slip clutch assemblies are similar to those previously described in connection with the transverse actuator systems, including spring members 130, cap members 132, and linking pins 134. The cap members 132, typically threaded nuts, are threadably received on the associated actuator shaft 20 and compress the spring member 130 against the associated drive gear 114. As previously described, the axial position of the cap member 132 on the actuator shaft 20 can be adjusted to provide a desired spring compression and hence desired spring force against the drive gear 114. In this way, the rotational friction between each drive gear 114 and the associated actuator shaft 20 can be adjusted so that it is possible to rotate an individual actuator shaft without transmitting the rotational motion back through the associated drive gear to the central pinion 116 and other two drive gears. The rotational friction is sufficiently high, however, so that when the drive gear 114 mounted on actuator shaft 20b is directly rotated (using knob 118) each of the three actuator shafts 20 will be caused to rotate in unison.

The reason that rotational motion can be transmitted from a drive gear 114 to an associated actuator shaft 20, but not from any individual actuator shaft back through the drive gears lies in the difference of total force required to rotate a single shaft rather than three shafts, the central pinion gear 116, and three drive gears 114. That is, when rotational motion is being transmitted from a drive gear 114 to a shaft, the rotational friction between the drive gear and shaft need only be sufficient to transmit the force required for rotating that single shaft. In contrast, when force is being transmitted from the shaft 20 to the entire gear system, the rotational friction between the shaft and the associated drive gear would have to be sufficiently high to transmit the total force required for the entire system. Thus, by adjusting the mechanical slip clutch assemblies to provide sufficient rotational friction to permit rotation of a single shaft by the associated drive gear, but insufficient to cause rotation of the entire gear system by a single shaft, the desired result is achieved.

Although the foregoing invention has been described in detail for purposes of clarity of understanding, it will be obvious that certain modifications may be practiced within the scope of the appended claims.

What is claimed is:

1. A device for mounting and positioning a precision component, said device comprising:

a frame member;

means on the frame member for securing the frame member to a surface;

a stage member suspended relative to the frame member;

means on the stage member for securing the component thereon;

a first externally threaded shaft threadably received in the frame member and engaging a surface of the stage member, said first shaft having a driver connection;

a lever threadably received on the first shaft;

a second externally threaded shaft threadably received in the frame member and disposed to laterally engage the lever, said second shaft having a driver connection, whereby rotation of the first shaft directly provides coarse positioning of the stage member and rotation of the second shaft to rotate the first shaft through the lever provides fine positioning of the stage member.

2. A device as in claim 1, further comprising a mechanical slip clutch which couples the lever to the first externally threaded shaft.

3. A device as in claim 2, wherein the mechanical slip clutch comprises:

a cap member threadably received on the first shaft in tandem with the lever;

a compression spring member disposed between the drive member and the cap member; and means for linking the cap member to the lever so that they rotate in unison, whereby the spring can be compressed sufficiently to increase the frictional torque between the lever and first shaft so that turning of the lever will rotate the shaft while still permitting direct rotation of the first shaft independent of the lever.

* * * * *